United States Patent
Wang

(10) Patent No.: US 11,956,491 B2
(45) Date of Patent: Apr. 9, 2024

(54) MULTIMEDIA MOBILE FOLLOWING SYSTEM BASED ON VEHICLE POSITIONING, AND METHOD

(71) Applicant: SHANGHAI BIHU NETWORK TECHNOLOGY CO., LTD, Shanghai (CN)

(72) Inventor: Jianfeng Wang, Shanghai (CN)

(73) Assignee: SHANGHAI BIHU NETWORK TECHNOLOGY CO., LTD, Shanghai (CN)

( * ) Notice: Subject to any disclaimer, the term of this patent is extended or adjusted under 35 U.S.C. 154(b) by 274 days.

(21) Appl. No.: 17/475,732

(22) Filed: Sep. 15, 2021

(65) Prior Publication Data

US 2022/0007069 A1    Jan. 6, 2022

Related U.S. Application Data

(63) Continuation of application No. PCT/CN2019/103756, filed on Aug. 30, 2019.

(30) Foreign Application Priority Data

Mar. 15, 2019   (CN) .......................... 201910197930.3

(51) Int. Cl.
| | |
|---|---|
| *H04N 21/414* | (2011.01) |
| *H04N 21/462* | (2011.01) |
| *H04N 21/81* | (2011.01) |
| *H04N 21/854* | (2011.01) |
| *H04W 4/029* | (2018.01) |
| *H04W 4/40* | (2018.01) |

(52) U.S. Cl.
CPC ... *H04N 21/41422* (2013.01); *H04N 21/4621* (2013.01); *H04N 21/812* (2013.01); *H04N 21/854* (2013.01); *H04W 4/029* (2018.02); *H04W 4/40* (2018.02)

(58) Field of Classification Search
CPC ......... H04N 21/41422; H04N 21/4621; H04N 21/812; H04N 21/854; H04N 21/4524; H04N 21/2668; H04W 4/029; H04W 4/40; H04W 4/025; G06Q 30/0266
See application file for complete search history.

(56) References Cited

U.S. PATENT DOCUMENTS

2013/0006775 A1*   1/2013   Jordan ................... G06F 17/00

FOREIGN PATENT DOCUMENTS

| CN | 102968857 | 3/2013 |
|---|---|---|
| CN | 103179081 | 6/2013 |

(Continued)

OTHER PUBLICATIONS

International Search Report issued for International Patent Application No. PCT/CN2019/103756, dated Dec. 24, 2019, 5 pages including English translation.

*Primary Examiner* — Anthony Bantamoi
(74) *Attorney, Agent, or Firm* — HSML P.C.

(57) ABSTRACT

The present invention sets forth a multimedia mobile following method based on vehicle positioning, involving: performing positioning with regard to a mobile phone, obtaining the position of a user of said target mobile phone, and activating multimedia equipment within a specified range so as to broadcast customized information. It is thus possible to achieve the effect of mobile following with multimedia broadcast information.

9 Claims, 1 Drawing Sheet

(56) References Cited

FOREIGN PATENT DOCUMENTS

| | | |
|---|---|---|
| CN | 103179082 | 6/2013 |
| CN | 109905452 | 6/2019 |
| WO | 2017034217 | 3/2017 |

* cited by examiner

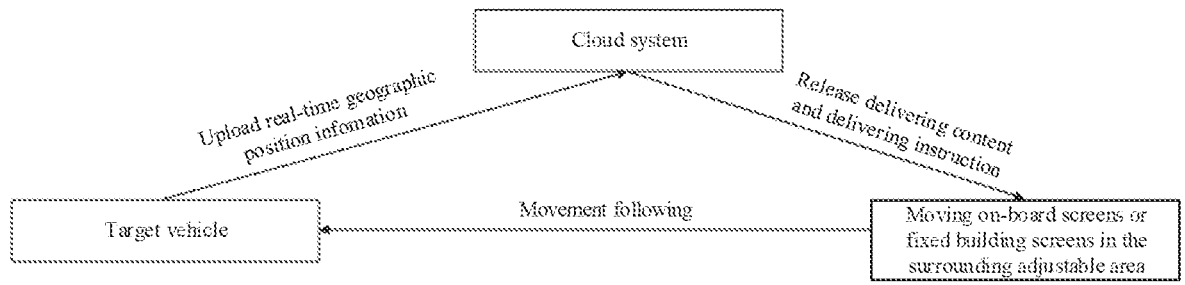

MULTIMEDIA MOBILE FOLLOWING SYSTEM BASED ON VEHICLE POSITIONING, AND METHOD

TECHNICAL FIELD

The present invention relates to a field of multimedia mobile playing, m particular to a multimedia mobile following system and method based on vehicle positioning.

BACKGROUND

Delivery technology of on-board mobile screen based on real-time cloud management: 1. by installing ultra-short focus projection equipment in taxis, buses and online-booked cars, the windows (comprising rear window and side windows) of the above vehicles can be turned into mobile screens through projection, LED/LCD and other technical means; 2. all vehicle projection equipment are connected to cloud terminal through 4G/5G, WiFi or other technical means for real-time communication with the cloud terminal; 3. the mobile terminal uploads information to the cloud terminal, and then the cloud terminal delivers customized advertising content according to the information uploaded by vehicle equipment, comprising vehicle position, corresponding time period, landmark corresponding to the vehicle, surrounding vehicles, surrounding people and other information; 4. the specific implementation method is that the cloud system is previously set with a delivering rule, and the vehicle projection equipment communicates with the cloud terminal in real time during the driving process of the vehicle. Once the delivering rule of the cloud terminal is triggered by a factor such as the vehicle position, the time period, or the identification based on a front vehicle equipment, the cloud terminal sends a corresponding delivering instruction to a specific vehicle screen. At this time, the vehicle screen equipment calls a corresponding picture that is previously downloaded from the cloud terminal and stored locally for delivery, or directly downloads the picture from the cloud terminal for delivery.

However, at present, there is no outdoor screen delivery system in the outdoor media industry, which can perform customized advertising delivery on a surrounding moving or fixed screen, based on vehicle position tracking and controlling.

SUMMARY

The present invention aims to overcome the above defects and provide a playing system that can realize mobile playing.

The present invention provides a multimedia mobile following system based on vehicle positioning, comprising a controlling terminal, a vehicle terminal, a remote service terminal and a playing terminal;

the controlling terminal, the vehicle terminal, the remote service terminal and the playing terminal are all provided with communication modules for realizing data interaction between each equipment;
the controlling terminal is also provided with an instruction module;
the vehicle terminal is also provided with a positioning module;
the remote service terminal is also provided with an identification module, an analysis module and an instruction playing module;
the playing terminal is also provided with a playing module;
wherein the instruction module sends an instruction to the remote service terminal for performing movement following playing to a target vehicle;
the positioning module sends positioning information of the vehicle to the remote service terminal;
the analysis module queries the positioning information of the target vehicle after receiving the instruction for movement following playing, and obtains the playing terminal that is currently online within a specified range according to the positioning information;
the identification module identifies a customized playing content of the current controlling terminal;
the instruction playing module sends a playing instruction of the customized playing content to the currently online playing terminal, which is obtained by the analysis module;
the playing module plays the customized playing content according to the playing instruction.

Further, the multimedia mobile following system based on vehicle positioning according to the present invention also has the following characteristics: that is, the remote service terminal is also provided with a determination module;
when one or all of the currently online playing terminals, which are obtained by the analysis module, have received previous playing instructions;
the determination module determines the playing content with priority, after judging the playing contents that are involved in the upcoming playing instruction and the previous playing instruction.

Further, the multimedia mobile following system based on vehicle positioning according to the present invention also has the following characteristics: that is, a specific judging method is as follows:
S1. determining whether a target playing terminal has received the previous playing instruction;
when a determination result is "no", sending a current playing instruction to target playing terminal;
when a determination result is "yes", performing step S2;
S2. determining whether the current playing instruction has priority;
when a determination result is "no", continuing the previous playing instruction;
when a determination result is "yes", performing step S3;
S3. determining whether the previous playing instruction has priority;
when a determination result is "no", sending the current playing instruction to the target playing terminal;
when a determination result is "yes", continuing the previous playing instruction.

Further, the multimedia mobile following system based on vehicle positioning according to the present invention also has the following characteristics: that is, the specific judging method is as follows:
in the step S3, when the determination result is "yes", performing step S4;
S4. determining a priority level of the previous playing instruction and the current playing instruction;
when the priority of the previous playing instruction is higher than that of the current playing instruction, continuing the previous playing instruction;
when the priority of the previous playing instruction is lower than that of the current playing instruction, sending the current playing instruction to the target playing terminal.

Further, the multimedia mobile following system based on vehicle positioning according to the present invention also has the following characteristics: that is, the remote service terminal is also provided with an inspection module;

the positioning module sends the positioning information of the vehicle to the remote service terminal at regular time or in real time;

the inspection module judges whether the playing instruction needs to be replaced according to the positioning information at time N+1.

Further, the multimedia mobile following system based on vehicle positioning according to the present invention also has the following characteristics: that is, a specific judging method is as follows:

S1. receiving the positioning information at time N+1;
S2. obtaining the playing terminal at time N+1;
S3. judging whether the playing terminal at time N+1 is consistent with the playing terminal at time N;
when a judgment result is "consistent", continuing the current playing instruction;
when a judgment result is "inconsistent", sending a playing instruction to the playing terminal at time N+1.

Further, the multimedia mobile following system based on vehicle positioning according to the present invention also has the following characteristics: that is, the controlling terminal also comprises a customized playing system;

the customized playing system realizes customization of target playing information.

Further, the multimedia mobile following system based on vehicle positioning according to the present invention also has the following characteristics: that is, the customization of target playing information comprises playing content, playing frequency, playing time and playing area.

Additionally, the present invention also provides a multimedia mobile following method based on vehicle positioning, which is applied to the multimedia mobile following system based on vehicle positioning, wherein after obtaining a position of a target vehicle by vehicle positioning, a multimedia equipment within a specified range is activated for performing customized information playing.

Further, the multimedia mobile following method based on vehicle positioning according to the present invention is realized by following steps:

S1. determining the target vehicle;
S2. obtaining geographic position information of the target vehicle;
S3. obtaining an online multimedia equipment within the specified range according to the geographic position information of S2;
S4. obtaining customized playing information;
S5. playing the customized playing information by the multimedia equipment obtained in S3.

Functions and Effects of the Present Invention:

The mobile phone, computer terminal or on-board mobile multimedia equipment according to the present invention is equipped with a specific applet or APP, which can position the vehicle through the base station of an operator or GPS; then, according to the geographic information of vehicle GPS, cloud intelligent advertising management system delivers advertising content and delivering instruction to the on-board screen or other outdoor screen that are connected to the cloud terminal and around the vehicle, in an area near the vehicle (such as within a 500 m radius range or other set range), and the on-board screen and the outdoor screen around the vehicle performs real-time customized advertising delivery according to the instruction; further, with the movement of the vehicle, an automatic adjustment of the advertising area is realized in a cloud system based on geographic position of the vehicle according to the movement situation of the vehicle, so as to realize an advertising following delivery based on the movement of the vehicle position, then, according to a variation of vehicle position, the cloud system may automatically issue delivering content and release delivering instruction to the moving or fixed advertising screen that is previously accessed into the system and in an area near the new position; that is, by position following of advertising area that moves based on the vehicle position, the targeted vehicle can see surrounding customized advertisements wherever it moves.

The present invention overcomes that there is no outdoor screen delivery system in the outdoor media industry, which can perform customized advertising to delivery on a surrounding moving or fixed screen, based on vehicle geographic position tracking and controlling. By accessing the controlling terminal to the cloud advertising delivery management system, the customized delivery according to the time period, the geographic position and the advertising content solves a lot of communication work in the early stage of traditional outdoor advertising, greatly shortening the cycle of upper and lower journals, and making the outdoor advertising delivery achieve the effect of fragmentation and customization, so that more small enterprises and individuals can easily launch outdoor screen advertising, and an effect of movement following playing is realized by the positioning delivery.

BRIEF DESCRIPTION OF THE DRAWINGS

FIG. 1 is an operation flow chart of the multimedia mobile following method based on vehicle positioning according to this embodiment.

DETAILED DESCRIPTION OF EMBODIMENTS

This embodiment provides a multimedia mobile following method based on vehicle positioning. In the method, after issuing an instruction to the cloud terminal, by a mobile phone, a computer or on-board mobile multimedia equipment, for delivering an advertisement to a target vehicle, and after Obtaining the position of the target vehicle through the positioning of the target vehicle, multimedia equipment within a specified range will be activated to play customized information, so that when the vehicle moves, all surrounding electronic equipment within a specified radius or diameter e.g. 500 m, 1000 m) will play the specified/customized content.

As shown in FIG. 1, this embodiment provides an operation flow chart of a multimedia mobile following system based on vehicle positioning, indicating the operation flow of the system, that is S1. enabling a cloud system to obtain geographic position information of a target mobile phone, by uploading the geographic position information from a vehicle to the cloud system;

S2. according to the above geographic position information, obtaining an on-board screen or a fixed screen (generally refers to the equipment on the platform of our company) in a surrounding adjustable area (within a specified radius or diameter), and releasing delivering content and delivering instruction to this kind of equipment by the cloud system.

S3. This kind of multimedia equipment customize the playing of playing information according to the instruction of S2.

Thus, when the vehicle moves, due to a reason of real-time update, an effect of movement following of playing content can be realized.

Based on the above method, a multimedia mobile following system based on vehicle positioning, according to this embodiment, comprises a general controlling terminal (equipment that can control and issue a command, such as a mobile phone, a computer terminal or on-board mobile multimedia equipment), a vehicle terminal (the vehicle terminal refers to a specified/selected target vehicle, generally speaking, all vehicles on this platform have the function of uploading positioning information), a remote service terminal (a cloud system) and a playing terminal.

The controlling terminal, the vehicle terminal, the remote service terminal and the playing terminal are all provided with communication modules for realizing data interaction between each equipment.

The controlling terminal is also provided with an instruction module, which sends an instruction to the remote service terminal for performing movement following playing to a target vehicle.

The vehicle terminal is also provided with a positioning module for sending positioning information of the vehicle to the remote service terminal. This transmitting process is generally in real time, so that when the system knows that a specified vehicle needs a movement following playing operation, the GPS information of the vehicle can be directly accessed, or when the remote service terminal needs to know the positioning information of the current vehicle, it can be transmitted directly at any time through this module.

The remote service terminal is also provided with an identification module, an analysis module and an instruction playing module.

The identification module identifies a customized playing content of the current controlling terminal, such as advertisement or multimedia information customized for the controlling terminal, or advertisement or multimedia information to be played set by the user of the controlling terminal.

The analysis module obtains the playing terminal that is currently online within a specified range (e.g. a radius of 100 m, 500 m or 1000 m, etc., which is set by the controlling terminal or the remote service terminal), according to the positioning information transmitted by the vehicle. The online playing terminal refers to the fixed advertising screen or equipment with a using right on the platform, as well as mobile equipment such as on-hoard projection equipment.

The instruction playing module sends a playing instruction of the customized playing content to the above-mentioned online playing terminal. The playing instruction comprises information such as playing time, playing frequency, playing mode, etc.

The playing terminal is also provided with a playing module, which plays the customized playing content according to the playing instruction According to the needs of users, in order to avoid the conflict of playing content, the remote service terminal in this embodiment is also provided with a determination module. When one or all of the currently online playing terminals, which are obtained by the analysis module, have received previous playing instructions; that is, the playing terminal that can be searched according to the positioning results of the current vehicle and needs to be sent a playing instruction, has received another playing instruction while the playing instruction has not been completed.

The determination module determines the playing content with priority, after judging the playing contents that are involved in the upcoming playing instruction and the previous playing instruction. This priority refers to the content that needs to be played preferentially in case of emergency, or the content that has priority to be played after price increase operations by business users.

The specific judging method is as follows:
S1. determining whether the target playing terminal has received a previous playing instruction;
when a determination result is "no", sending a current playing instruction to the target playing terminal;
when a determination result is "yes", performing step S2;
S2. determining whether the current playing instruction has priority;
when a determination result is "no", continuing the previous playing instruction;
when a determination result is "yes", performing step S3;
S3. determining whether the previous playing instruction has priority;
when a determination result is "no", sending the current playing instruction to the target playing terminal;
when a determination result is "yes", continuing the previous playing instruction, and sending the current playing instruction to the target playing terminal after the online playing is completed.

In addition, when the playing contents contained in the previous and current playing instructions both have priority, a priority level can be further determined as the following specific methods:
in the step S3, when the determination result is "yes", performing step S4;
S4. determining the priority level of the previous playing instruction and the current playing instruction;
when the priority of the previous playing instruction is higher than that of the current playing instruction, continuing the previous playing instruction, and sending the current playing instruction to the target playing terminal after the online playing is completed;
when the priority of the previous playing instruction is lower than that of the current playing instruction, sending the current playing instruction to the target playing terminal.

In addition, in order to achieve an effect of real-time movement following playing and avoid the problem that the surrounding video does not keep up after the vehicle moves a long distance, the remote service terminal is also provided with an inspection module.

The positioning module sends the positioning information of the vehicle to the remote service terminal at regular time (e.g. every 5 min, 10 min, etc.) or in real time.

The inspection module judges whether the playing instruction needs to be replaced according to the positioning information at time N+1.

A specific judging method is as follows:
S1. receiving the positioning information at time N+1;
S2. obtaining the playing terminal at time N+1;
S3. judging whether the playing terminal at time N+1 is consistent with the playing terminal at time N;
when a judgment result is "consistent", continuing the current playing instruction;
when a judgment result is "inconsistent", sending a playing instruction to the playing terminal at time N+1.

Furthermore, when part of the playing terminals at time N+1 overlaps with the playing terminals at time N, the playing instruction are only sent to the different playing terminals.

In addition, the controlling terminal according to this embodiment also comprises a customized playing system.

The customized playing system realizes customization of target playing information, such as playing content, playing frequency, playing time and playing area, etc.

The custom playback system realizes the customization of target playback information, such as playback content, playback frequency, playback time and playback area, etc.

For example, Wechat based applet or APP. Advertisement delivering time period may be selected by entering an advertisement delivery customizing page through a mobile phone, a computer or a tablet. The geographic position of advertisement delivery, which may be a business district, a building or a street, may be selected by entering an advertisement delivery customizing page. Delivering content can be edited on a mobile phone, and templates with different styles and contents can be selected. After the user selects the advertisement delivering time period and the geographic area, edits the delivering content, and selects the delivering template, the system can generate a preview, so that the customer can view a delivery preview picture of the customized content. The delivering system can provide bid function based on time period and geographic position, and users can see the bidding situation and bid at the controlling terminal. After confirming the delivering information, users can pay in the form of WeChat, bank card or Alipay. After the user pays, the order is accepted by the system. The system selects on-board screens or other outdoor screens that are connected to the system according to the delivering time period, the geographic position and the advertising content of the customer, and releases the content and the instruction though 4/5G network, thereby playing customized content on corresponding screens. After completes the playing, the system generates a delivery data report, comprising the screen-monitoring pictures that are delivered, the effect pictures, the playing times or the operation situation of the vehicle screens.

The invention claimed is:

1. A multimedia mobile following system based on vehicle positioning, comprising a controlling terminal, a vehicle terminal, a remote service terminal and a playing terminal;

the controlling terminal, the vehicle terminal, the remote service terminal and the playing terminal are all provided with communication modules, the communication modules are configured to realize data interaction between each equipment;
the controlling terminal is also provided with an instruction module;
the vehicle terminal is also provided with a positioning module;
the remote service terminal is also provided with an identification module, an analysis module and an instruction playing module;
the playing terminal is also provided with a playing module;
wherein the instruction module is configured to send an instruction to the remote service terminal for performing movement following playing to a target vehicle;
the positioning module is configured to send positioning information of the vehicle to the remote service terminal;
the analysis module is configured to query the positioning information of the target vehicle after receiving the instruction for movement following playing, and is configured to obtain the playing terminal that is currently online within a specified range according to the positioning information;
the identification module is configured to identify a customized playing content of the current controlling terminal; the instruction playing module is configured to send a playing instruction of the customized playing content to the currently online playing terminal, which is obtained by the analysis module;
the playing module is configured to play the customized playing content according to the playing instruction, the remote service terminal is also provided with a determination module; when one or all of the currently online playing terminals, which are obtained by the analysis module, have received previous playing instructions;
the determination module is configured to determine the playing content with priority, after judging the playing contents that are involved in the upcoming playing instruction and the previous playing instruction.

2. The multimedia mobile following system based on vehicle positioning of claim 1, wherein a specific judging method is as follows:

S1. determining whether a target playing terminal has received the previous playing instruction;
when a determination result is "no", sending a current playing instruction to the target playing terminal; when a determination result is "yes", performing step S2;
S2. determining whether the current playing instruction has priority; when a determination result is "no", continuing the previous playing instruction;
when a determination result is "yes", performing step S3;
S3. determining whether the previous playing instruction has priority;
when a determination result is "no", sending the current playing instruction to the target playing terminal;
when a determination result is "yes", continuing the previous playing instruction.

3. The multimedia mobile following system based on vehicle positioning of claim 2, wherein the specific judging method is as follows:

in the step S3, when the determination result is "yes", performing step S4;
S4. determining a priority level of the previous playing instruction and the current playing instruction;
when the priority of the previous playing instruction is higher than that of the current playing instruction, continuing the previous playing instruction;
when the priority of the previous playing instruction is lower than that of the current playing instruction, sending the current playing instruction to the target playing terminal.

4. The multimedia mobile following system based on vehicle positioning of claim 1, wherein
the remote service terminal is also provided with an inspection module;
the positioning module is configured to send the positioning information of the vehicle to the remote service terminal at regular time or in real time;
the inspection module is configured to judge whether the playing instruction needs to be replaced according to the positioning information at time N+1, wherein N is a positive number.

5. The multimedia mobile following system based on vehicle positioning of claim 4, wherein a specific judging method is as follows:

S1. receiving the positioning information at time N+1;
S2. obtaining the playing terminal at time N+1;
S3. judging whether the playing terminal at time N+1 is consistent with the playing terminal at time N;

when a judgment result is "consistent", continuing the current playing instruction;

when a judgment result is "inconsistent", sending a playing instruction to the playing terminal at time N+1.

6. The multimedia mobile following system based on vehicle positioning of claim 1, wherein the controlling terminal also comprises a customized playing system;

the customized playing system realizes customization of target playing information.

7. The multimedia mobile following system based on vehicle positioning of claim 6, wherein the customization of target playing information comprises playing content, playing frequency, playing time and playing area.

8. A multimedia mobile following method based on vehicle positioning, applied to the multimedia mobile following system based on vehicle positioning of claim 1, wherein after obtaining a position of a target vehicle by vehicle positioning, a multimedia equipment within a specified range is activated for performing customized information playing.

9. The multimedia mobile following method based on vehicle positioning of claim 8, realized by following steps:

S1. determining the target vehicle;

S2. obtaining geographic position information of the target vehicle;

S3. obtaining an online multimedia equipment within the specified range according to the geographic position information of S2;

S4. obtaining customized playing information;

S5. playing the customized playing information by the multimedia equipment obtained in S3.

* * * * *